United States Patent
Hildebrand et al.

(10) Patent No.: US 9,916,325 B2
(45) Date of Patent: Mar. 13, 2018

(54) QUICK INITIALIZATION OF DATA REGIONS IN A DISTRIBUTED STORAGE SYSTEM

(71) Applicant: International Business Machines Corporation, Armonk, NY (US)

(72) Inventors: Dean Hildebrand, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 538 days.

(21) Appl. No.: 14/502,770

(22) Filed: Sep. 30, 2014

(65) Prior Publication Data

US 2016/0092468 A1    Mar. 31, 2016

(51) Int. Cl.
G06F 17/30      (2006.01)
H04L 29/08      (2006.01)
G06F 11/14      (2006.01)
G06Q 10/00      (2012.01)

(52) U.S. Cl.
CPC ....... *G06F 17/30215* (2013.01); *G06Q 10/00* (2013.01)

(58) Field of Classification Search
CPC .......... H04L 29/08882; G06F 11/1471; G06F 11/1482; G06F 17/30008; G06F 17/30215; H05K 999/99
USPC ................................. 707/633, 648
See application file for complete search history.

(56) References Cited

U.S. PATENT DOCUMENTS

| | | |
|---|---|---|
| 5,537,588 A | 7/1996 | Engelmann et al. |
| 6,243,795 B1 | 6/2001 | Yang et al. |
| 6,292,808 B1 | 9/2001 | Obermarck et al. |
| 6,493,826 B1 | 12/2002 | Schofield et al. |
| 6,922,757 B2 | 7/2005 | Frank et al. |

(Continued)

FOREIGN PATENT DOCUMENTS

| | | |
|---|---|---|
| CA | 2521595 A1 | 10/2004 |
| EP | 1003103 A2 | 5/2000 |

OTHER PUBLICATIONS

List of IBM Patents or Patent Applications Treated as Related.
(Continued)

*Primary Examiner* — Hosain Alam
*Assistant Examiner* — Robert F May
(74) *Attorney, Agent, or Firm* — Sherman IP LLP; Kenneth L. Sherman; Steven Laut

(57) ABSTRACT

A method includes flushing a write transaction based on byte-ranges within a file system block. It is determined if the write transaction is a first write transaction to the file system block and whether to flush the received write transaction to a recovery log. If it is determined to flush the write transaction to the recovery log and the received write transaction is the first write transaction: the data associated with the write transaction is appended in the recovery log and byte-ranges remaining in the file system block are recorded, and also recording an associated particular bit value or particular bit pattern that the remaining byte-ranges must be set to before the remaining byte-ranges are accessed or when a recovery sequence for recovering data in the recovery log executes due to failure. The write transaction is replicated. The entire file system block byte-range is marked as committed.

20 Claims, 7 Drawing Sheets

(56) References Cited

U.S. PATENT DOCUMENTS

| | | | |
|---|---|---|---|
| 7,475,185 B2 | 1/2009 | Nakanishi et al. | |
| 7,519,628 B1* | 4/2009 | Leverett | G06F 17/30067 |
| 7,558,914 B2 | 7/2009 | Ashton et al. | |
| 7,805,632 B1 | 9/2010 | Luke et al. | |
| 8,006,027 B1 | 8/2011 | Stevens et al. | |
| 8,046,406 B2 | 10/2011 | Fricke et al. | |
| 8,108,602 B2 | 1/2012 | New et al. | |
| 8,402,230 B2 | 3/2013 | Bradford et al. | |
| 8,463,748 B1* | 6/2013 | Kushwah | G06F 17/30088 707/648 |
| 9,361,306 B1* | 6/2016 | Pawar | G06F 17/30168 |
| 2003/0088814 A1* | 5/2003 | Campbell | G06F 17/30067 714/54 |
| 2007/0088970 A1* | 4/2007 | Buxton | G06F 11/1471 714/2 |
| 2008/0046644 A1 | 2/2008 | De Spiegeleer | |
| 2008/0077742 A1* | 3/2008 | Ashton | G06F 13/387 711/136 |
| 2010/0169543 A1* | 7/2010 | Edgington | G06F 12/0246 711/103 |
| 2011/0137874 A1* | 6/2011 | Grosman | G06F 17/30353 707/688 |
| 2011/0161557 A1 | 6/2011 | Haines et al. | |
| 2011/0307736 A1* | 12/2011 | George | G06F 17/30519 714/6.2 |
| 2012/0011398 A1* | 1/2012 | Eckhardt | G06F 11/2028 714/15 |
| 2012/0297121 A1* | 11/2012 | Gorobets | G06F 12/0246 711/103 |
| 2013/0019076 A1* | 1/2013 | Amidi | G06F 11/1441 711/162 |
| 2013/0117503 A1 | 5/2013 | Nellans et al. | |
| 2013/0268492 A1 | 10/2013 | Soulier et al. | |
| 2013/0282965 A1 | 10/2013 | Sengupta et al. | |
| 2013/0297880 A1* | 11/2013 | Flynn | G06F 1/183 711/128 |
| 2013/0304972 A1 | 11/2013 | Aso | |

OTHER PUBLICATIONS

McObject LLC., "Database Persistence, Without the Performance Penalty", 2013, McObject Precision data management, pp. 1-9, United States.

Kang, W-H., "Flash-Based Extended Cache for Higher Throughput and Faster Recovery", Proceedings of the 38th International Conference on Very Large Data Bases (VLDB Endowment), Aug. 27-31, 2012, pp. 1615-1626, vol. 5, No, 1, United States [downloaded: URL: http://vldb.org/pvldb/vol5/p1615_woon-hakkang_vldb2012.pdf].

Pelley, S., et al., "Storage Management in the NVRAM Era", Proceedings of the 40th International Conference on Very Large Data Bases (VLDB Endowment), 2013, pp. 121-132, vol. 7, No. 2, United States [downloaded:http://www.vldb.org/pvldb/vol7/p121-pelley.pdf].

List of IBM Patents or Applications Treated as Related.

* cited by examiner

QUICK INITIALIZATION OF DATA REGIONS IN A DISTRIBUTED STORAGE SYSTEM

BACKGROUND

Embodiments of the invention relate to buffering and data replication and, in particular, quick initialization using buffering and replicating particular regions in a distributed file system.

Numerous workloads, such as virtual machines (VMs), databases, and accesses to user home directories, send small and synchronous write operations to storage. In addition, many small writes to a file system actually translate into many more small writes to the storage layer to update the recovery log and various metadata structures. Storage controllers typically use non-volatile read and write memory (NVRAM) to buffer these small writes and reduce their latency, but many systems, for example, systems based on a software-defined storage architecture, cannot install such expensive storage devices in every node. This is a particular problem for spinning disk-only based systems because of their poor performance for such operations. While storing data on large numbers of solid-state drives (SSDs) in every server can improve the situation, it is very costly given the typical capacity requirements in modern data centers. In addition, naively using SSDs to buffer random writes can severely degrade the lifetime of SSDs.

BRIEF SUMMARY

Embodiments of the invention relate to quick initialization using buffering and replicating particular regions in a distributed file system. One embodiment includes a method including flushing a received write transaction from a first memory device to a second memory device on a node in a file system based on one or more byte-ranges within a file system block. In one embodiment, the method determines if the received write transaction is a first write transaction for writing data associated with the received write transaction to the file system block. It is determined to flush the received write transaction to a recovery log that is stored in a non-volatile storage layer of the file system. In one embodiment, if it is determined to flush the received write transaction to the recovery log and the received write transaction is the first write transaction for writing data associated with the received write transaction to the file system block, then the method includes appending the data associated with the received write transaction in the recovery log and recording in the recovery log byte-ranges remaining in the file system block after writing the data associated with the write transaction to the file system block and an associated particular bit value or a particular bit pattern that the remaining byte-ranges must be set to before the remaining byte-ranges are accessed or when a recovery sequence for recovering data in the recovery log executes due to a software or hardware failure. If required, the write transaction as well as information regarding remaining byte-ranges and the associated particular bit value or the particular bit pattern that must be set is replicated in another non-volatile storage layer of another node. Then the entire file system block byte-range is marked as committed.

These and other features, aspects and advantages of the present invention will become understood with reference to the following description, appended claims and accompanying figures.

DETAILED DESCRIPTION

Aspects of the present invention are described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Figure 1:
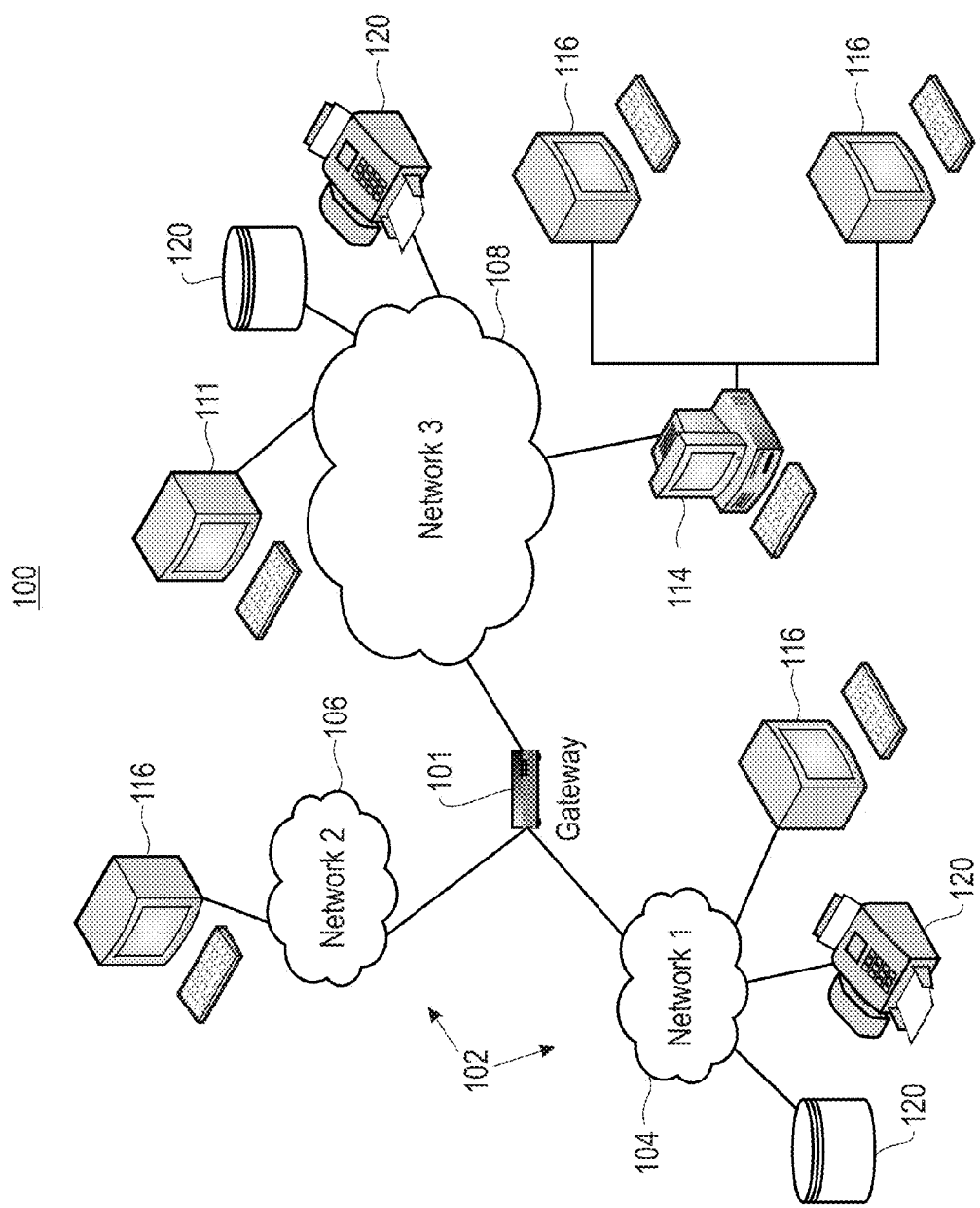
FIG. 1 is a network architecture for quick initialization using buffering and replicating particular regions in parallel file systems, according to an embodiment of the present invention.

FIG. 1 illustrates a network architecture 100, in accordance with one embodiment. As shown in FIG. 1, a plurality of remote networks 102 are provided, including a first remote network 104 and a second remote network 106. A gateway 101 may be coupled between the remote networks 102 and a proximate network 108. In the context of the present network architecture 100, the networks 104, 106 may each take any form including, but not limited to, a LAN, a WAN, such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

In other examples, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, therefore allowing access and distribution of services across many computing systems. Cloud computing typically involves an Internet connection between the systems operating in the cloud, but other techniques of connecting the systems may also be used, as known in the art.

In one or more embodiments, the system 100 utilizes a process for buffering and replicating data that has been added to a file system to improve the small write performance of both application updates and internal file system metadata updates by placing the data in NVRAM (such as flash-backed dual in-line memory module (DIMMs) or SSDs) and then replicating the data on one or more servers (depending on reliability requirements). One or more embodiments reduce the latency of each update while not reducing the availability of the data under node failures. In one example, after the data is hardened (i.e., placed in stable storage and, if required, replicated such to survive storage system failures), the file system gathers the data in memory into large chunks (if contiguous blocks are found) and flushes it to the storage layer. Once data has been flushed from memory to its permanent location, the data may be cleared from NVRAM. In one embodiment, if upon a node failure data exists in the NVRAM that has not yet been flushed to its permanent location, then a recovery sequence executes that flushes the data to storage from one of the replicated copies in NVRAM. In one example, a virtual machine (VM) writing to storage was simulated by a benchmark that performed a random 8 KB write workload to a single 50 GB file. With the use of a 500 MB NVRAM, which is stored on consumer-grade SSDs locally and on a partner node for fault tolerance, the performance increases from ~50 IOPS when writing directly to the spinning disks to ~3,000 IOPS when using one or more embodiments. Using more threads will somewhat improve the performance to the disk subsystem, but the maximum throughput of writing to a disk subsystem is very limited. When more threads are used, the higher maximum write performance of SSDs may be fully exploited. With the use of more NVRAM and/or a faster storage medium, e.g., flash-backed DIMMs, the performance may be improved even further. In one embodiment, because of the typically small size of available non-volatile random-access memory (NVRAM) devices, only small writes are buffered. With SSDs the situation is somewhat different, much larger write sizes may be buffered but with lower performance gain. In one example, the file system buffers the data in a cyclical manner, transforming all incoming random requests into a series of synchronous sequential updates to increase performance and reduce SSD degradation.

In one or more embodiments, the system 100 utilizes a process for compressing, buffering and replicating zero regions in a distributed storage system, e.g., a parallel file system, to resolve the "write amplification" problem that otherwise occurs when writing to unallocated blocks in a sparse file when the size of the write request is smaller than the size of the file system block. One or more embodiments may be used with a process for improving the write performance of both application updates and internal file system metadata updates by placing the data in NVRAM (such as flash-backed DIMMs) or SSDs, and then replicating the data on one or more servers (depending on reliability requirements). In one embodiment, once the write transaction data and the zeroes (or other bit pattern) in the remaining parts of the file system block have been written to their permanent location in the file system, the write transaction data and the compressed data (which tracked the zeroes that needed to be written the rest of the file system block) may be cleared from NVRAM. In one embodiment, if upon a node failure data exists in the NVRAM that has not yet been flushed to its permanent location in the file system, then a recovery sequence executes that flushes the write transaction data to primary storage, and writes the required number of values (e.g., zeroes, etc.) or other bit pattern(s) to the rest of the file system block, from one of the available replicated copies.

Figure 2:
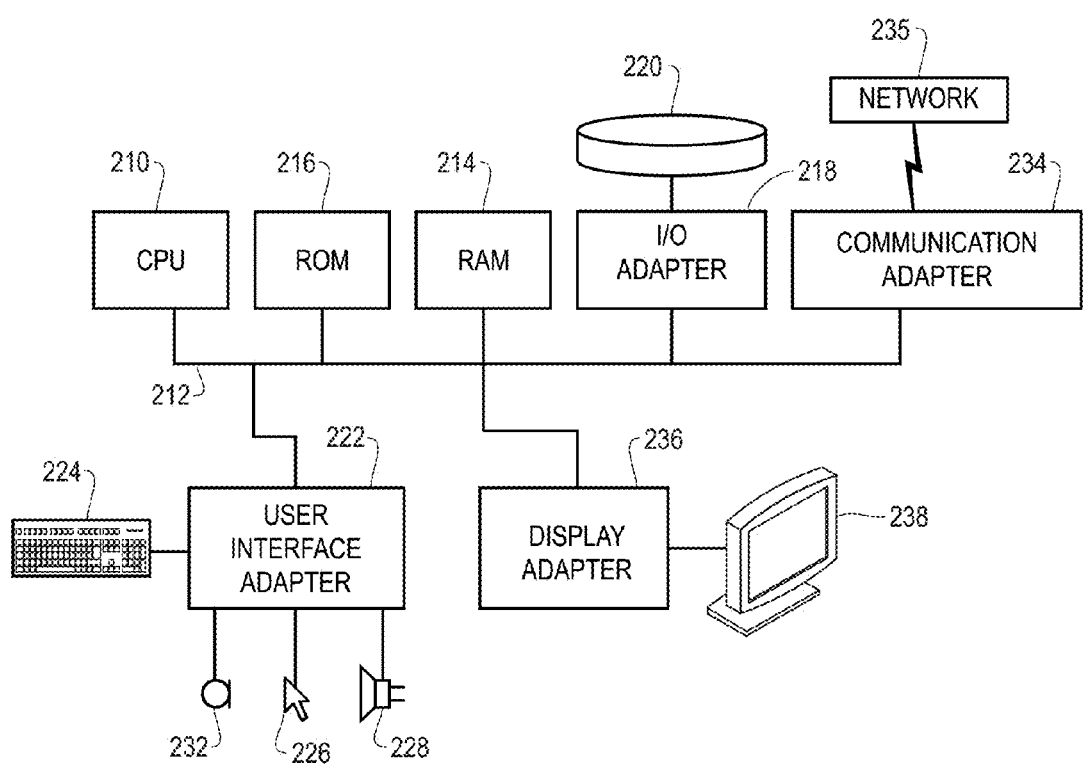
FIG. 2 shows a representative hardware environment that may be associated with the servers and/or clients of FIG. 1.

FIG. 2 shows a representative hardware environment associated with a user device 116 and/or server 114 of FIG. 1, in accordance with one embodiment. In one example, a hardware configuration includes a workstation having a central processing unit 210, such as a microprocessor, and a number of other units interconnected via a system bus 212. The workstation shown in FIG. 2 may include a Random Access Memory (RAM) 214, Read Only Memory (ROM) 216, an I/O adapter 218 for connecting peripheral devices, such as disk storage units 220 to the bus 212, a user interface adapter 222 for connecting a keyboard 224, a mouse 226, a speaker 228, a microphone 232, and/or other user interface devices, such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

In one example, the workstation may have resident thereon an operating system, such as the MICROSOFT WINDOWS Operating System (OS), a MAC OS, a UNIX OS, etc. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 3:
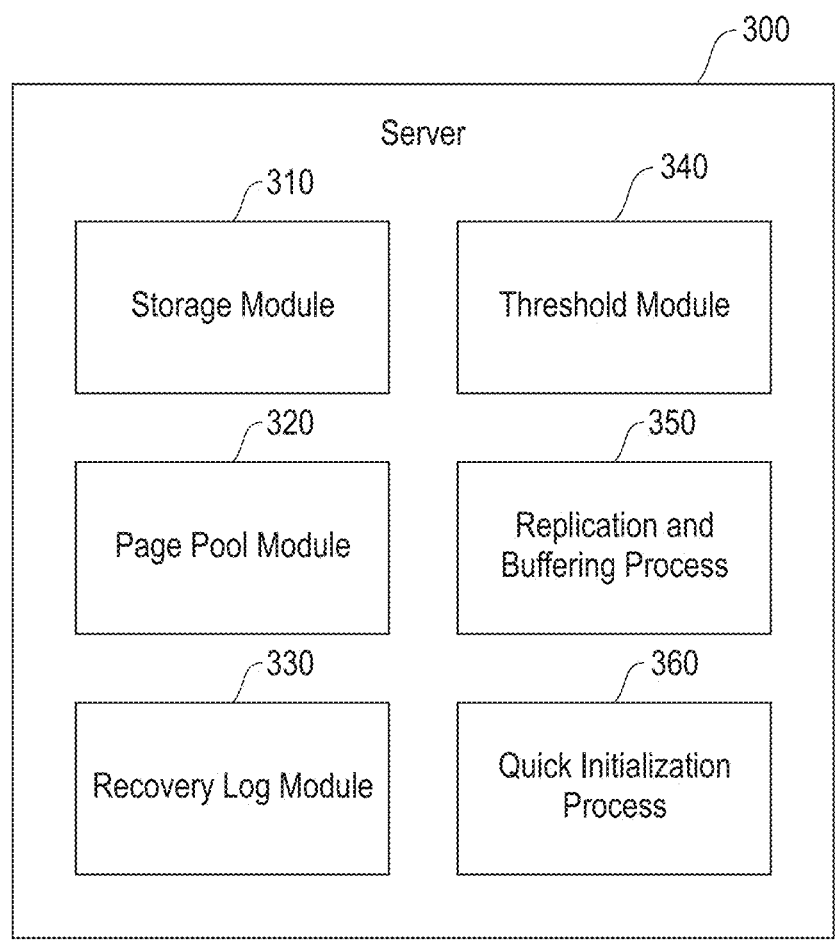
FIG. 3 illustrates a block diagram of an example server for quick initialization using buffering and replicating particular regions in a distributed storage system, in accordance with an embodiment of the invention.

FIG. 3 shows an implementation of system 100 as a server 300 for compressing, buffering and replicating all particular values (e.g., zeroes, etc.) or other particular bit pattern(s)

regions in a distributed file system. In one embodiment, the server 300 may be used for buffering and replicating data in a file system to improve the small write performance of both application updates and internal file system metadata updates by placing the data in NVRAM or SSDs, and replicating the data on one or more servers (depending on reliability requirements). In one embodiment, server 300 comprises a storage module 310, a buffer pool module 320, a recovery log module 330, an optional threshold module 340, a replication and buffering process 350 and a quick initialization process 360. In one embodiment, the quick initialization process 360 may be used with or without a portion or all of the other modules.

In one embodiment, server 300 using the quick initialization process 360 solves a write amplification problem that occurs when first writing to a sparse file where the file system block is larger than the size of write requests. In another embodiment, server 300 may also take advantage of NVRAM in file system client nodes to reduce the latency of small and synchronous writes using the replication and buffering process 350 that scales write performance with the addition of file system client nodes, avoiding bottlenecks in small amount of NVRAM at the storage controller 440 (FIG. 4) level.

In one embodiment, the targeted workloads for using the replication and buffering process 350 include VMs, logging, etc. that includes small synchronous writes. Due to the size of the file system recovery log of the recovery log module 330 (which may be limited), in one embodiment bursts of small write requests are absorbed, and then are written back to system storage (e.g., network shared disk (NSD 425), redundant array of inexpensive disks (RAID) disk 450, FIG. 4) using the storage module 310 in the background. In one example embodiment, if the amount of small write requests remains excessive for a long period of time, the system (e.g., system 400) using the server 300 will enter a steady state where write requests may need to wait for the recovery log of the recovery log module 330 to be wrapped before new write requests may be logged using the recovery log module 330.

Figure 4:
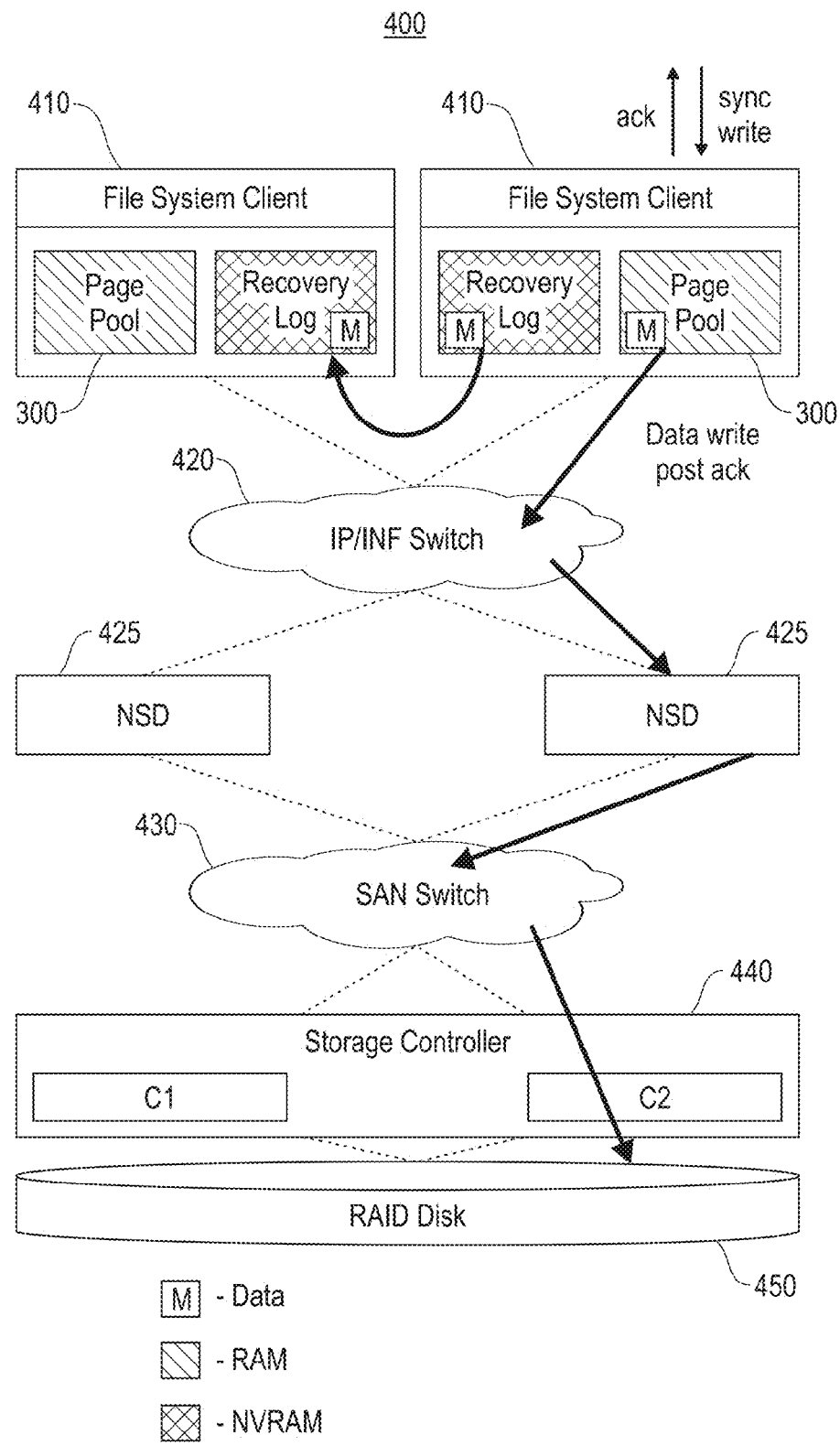
FIG. 4 illustrates an example high-level view of a distributed system for quick initialization using buffering and replicating particular regions for a distributed storage system, in accordance with an embodiment of the invention.

In one embodiment, logging data in the recovery log of the recovery log module 330 improves the efficiency of write requests to the back end storage system 400 (FIG. 4). In one embodiment, by logging write requests using the recovery log module 330, the replication and buffering process 350 allows small writes to be gathered into larger chunks in the buffer pool (virtual memory of the file system) of the buffer pool module 320 before they are written back to the permanent storage of the system 400 (FIG. 4). This is especially beneficial when the back end storage system 400 lacks any sort of NVRAM to buffer small write requests. In one embodiment, when writing data having a byte-range (e.g., 0-255, −129-127, etc.) that has a size smaller than a full block to an unallocated storage block, the file system must first write zeroes (or a pattern of bits) to the entire block (or the remaining regions of the file system block not in the write transaction) using the quick initialization process 360. In one example, this means that a 4K sized write can turn into a 1 MB sized write, significantly increasing the latency of small writes to the file system. In one embodiment, write logging avoids this increased latency by logging the fact that the block needs to be zeroed out, allowing one of either two things to occur that improve performance. Either more writes occur to the block, avoiding the need to zero out the block at all, or, if no more writes to this block occur, then the full block may be written out to permanent storage in the background.

In one embodiment, once the zeroes (or pattern of bits) are written to a permanent storage location (e.g., NSDs 425, RAID disk 450, FIG. 4), the compressed data may be cleared from the recovery log in NVRAM. In one embodiment, upon a node failure, if data exists in the recovery log in NVRAM that has not yet been flushed to a permanent storage location, then a recovery sequence executes and flushes the data to permanent storage from one of the replicated copies in the recovery log in NVRAM and writes the required number of zeroes (or other bit pattern) to the rest of the file system block. In one or more embodiments, placing the file system recovery log in NVRAM of client nodes (e.g., recovery log module 330 of server 300) improves performance (since many metadata operations require updates to the recovery log). In one example, the maximum size of the recovery log is about 1 GB, whereas most NVRAM is rather small (e.g., 500 MB). Therefore, if the optional threshold module 340 (FIG. 3) is implemented, the write log threshold of the threshold module 340 may be kept at rather small values, such as 4K or 8K. In one embodiment, since there is only a single recovery log of the recovery log module 330, for each node (e.g., server 300) and file system, if there are too many applications having a burst of small writes, then the applications should be moved to use different file systems or be placed on separate nodes, both of which use separate recovery log regions.

FIG. 4 illustrates an example high-level view of a distributed system 400 for quick initialization using buffering and replicating particular regions (e.g., zeroes or a particular known bit pattern) for a distributed storage system 400, in accordance with an embodiment of the invention. In one example embodiment, the system 400 includes multiple file system clients 410 that each may implement server 300, an Internet protocol (IP)/interface (INF) switch 420, NSDs 425, storage area network (SAN) switch 430, storage controller 440 and RAID disk 450. It should be noted that other components, number of components, etc. may be implemented in system 400 without changing the scope of the one or more embodiments. In one example embodiment, if NVRAM (e.g., recovery log module 330 of server 300) is used in the file system nodes (e.g., GPFS clients 410) exceeds the amount in the storage controller (440) (since it could be installed in every file system node), then write logging using replication and buffering process 350 assists in reducing latency. In another embodiment, if the NVRAM available on the file system nodes (e.g., GPFS clients 410) or on the network (in some other node or server or appliance) has lower latency (from the perspective of the application) than the storage controller (440) then write logging using replication and buffering process 350 assists in reducing latency.

In one embodiment, the recovery log of the file system 410 is used for quick initialization to determine whether to flush a received write transaction from the recovery log to a permanent storage (e.g., RAID disk 450) on a node in the system 400 based on whether the range for the file system block is placed in the recovery log and if the received write transaction is a first write transaction to the file system block. In one embodiment, if it is determined to flush the received write transaction and the received write transaction is the first write transaction to the file system block, then the quick initialization process 360 (FIG. 3) appends data associated with the received write transaction in the recovery log of the file system 410 and records that remaining ranges of the file system block must be set to zeroes or a particular known bit pattern. If required, data is replicated in another node in a distributed non-volatile layer and the range for the file system block is marked as committed.

In one embodiment, for a system with internal storage in each client node, if NVRAM is available either on a set of client nodes or in a separate set of nodes, the use of quick initialization with or without write logging using one or more embodiments improves performance over the direct use of internal magnetic disks of each client node. In one embodiment, storage system with a fast write log such as RAID controller, may be employed, but typically it is limited in the amount of NVRAM it supports. In one embodiment, if NVRAM can be placed in each file system client node, aggregate performance of all clients should increase with each additional client node. For a storage system with separate client and servers, the write path in this environment is very long. For example, it takes two hops to hit the NVAM in the storage controllers, increasing the write latency. In one embodiment, placing NVRAM in the file system client nodes will decrease latency and increase the scalability and performance of small writes.

In one example embodiment, the NVRAM configuration in file system client nodes 410 may include flash-backed DIMMS, such as that which ships in the IBM x-series M4 server, or SSDs installed on every file system node. In one embodiment, the file system client nodes 410 and the recovery log (e.g., of recovery log module 330, FIG. 3) are replicated (and possibly striped) across the file system nodes, ensuring that each datum is on two different nodes. In one example embodiment, all recovery logs for the entire system are stored on one or two (or more) fast flash-based storage system (which includes NVRAM inside of it). In another example embodiment, data is stored on disks, and metadata (which includes the recovery log) on SSDs.

In another embodiment, the recovery log is stored in a separate storage media from other file system metadata. In this embodiment, a "system.log" pool (the storage media on which the recovery logs are stored) is created and specified when the file system is created. In one embodiment, once the system.log pool is created, the file system recovery log will automatically be placed in the system.log pool. In one embodiment, the user may specify a different replication factor for the system.log pool, so recovery logs are stored with replication different from other metadata in the "system" pool (the storage media on which file system metadata and/or data are stored).

In one example embodiment, the amount of NVRAM usable by the recovery log on each file system client node 410 may be 128 MB or more, with a recommended size of 1 GB. In one embodiment, with replication, the size needed for the recovery log is doubled. In one embodiment, the smallest amount that may be logged is dependent upon the granularity of file system dirty bits, which is the granularity that the file system can track and record updates to file system data blocks. In one example, for a VM workload that frequently requires 4 KB writes, it is necessary to make sure bits can support this small amount.

In one embodiment, the recovery log of each file system (FS) (e.g., global parallel file system (GPFS)) client 410 is placed on fast storage, such as NVRAM (e.g., flash backed DIMM), SSD, or PCIe SSD card. The fast storage can then be located, for example, in each FS client 410, an SSD box connected to the storage controller 440, or on SSDs in the storage controller 440. In one example, if the recovery log is stored on the file system client 410 node and requires protection from node failure, the recovery log is set to be replicated in fast storage of two or more client nodes. In one embodiment, if the optional threshold module 340 (FIG. 3) is implemented, the write log threshold is set to the largest write size to log (4K or 32K for example). In one example, at fsync time (which includes synchronous writes or asynchronous writes followed by an fsync call), the data is logged into the recovery log of the file system client nodes 410 if the writes are less than a user specified threshold (if the optional threshold module 340 (FIG. 3) is implemented). The log is forced (which means it is placed on the physical storage device) to ensure that the data is hardened in the faster storage.

Data is never read out of the recovery log during normal operation (without any disk, node, or other hardware failures), but kept in the buffer pool of the file system client 410 nodes, and written back to permanent storage at a later point in time by a writeback thread. In one embodiment, performance can be improved by having the writeback threads write most of the data in the buffer pool to permanent storage before the need arises to remove records from the recovery log to make room for new records. If the data is still in the buffer pool when the records need to be removed from the recovery log, then the data must be first flushed to permanent storage prior to the records being removed from the recovery log (which is performed by logwrap). Flush from buffer pool prior to cleaning records from recovery log ensures that incoming writes have room in the recovery log to place data, and incoming writes will not have to wait for space to be freed up. When writing the buffer (a file system block) out to permanent storage (writeback thread or logwrap), all dirty ranges in a file system block are written out to permanent storage.

In one embodiment, when logwrap occurs, the replication and buffering process 350 (FIG. 3) checks to determine, for a logged record, if the buffer still is dirty. If the buffer is still dirty, which means that a writeback thread has not already written the data to permanent storage, then all dirty ranges for the buffer are written to permanent storage. In one example, if there are many write log records for a single file system block, then the first one will cause all dirty data (including the compressed zeroes or other bit pattern) for the file system block to be written to permanent storage, and the following write log records will be removed from the recovery log of the file system client 410 node with no further data to be written out to permanent storage. If a node fails, the file system 400 manager will run recovery, and write the data recorded in the recovery log to permanent storage (e.g., RAID disk 450).

In one embodiment, when dirty data is flushed from the buffer pool of the file system client 410 to permanent storage, the sizes of the dirty ranges within the buffer are checked, for example, to see if they are less than the threshold if the optional threshold module 340 (FIG. 3) is implemented. In one example, if any range is greater than the optional threshold, the buffer ranges are written out to permanent storage. Otherwise, each range is placed in the recovery log of the file system client 410. In one embodiment, if another file system client 410 node needs to read the data that is dirty in another client's buffer pool, then the data will have to be flushed to permanent storage first (e.g., NSD 425, RAID disk 450, etc.) so it may be read from the other file system client 410 node. This is to maintain POSIX file system semantics. Therefore, in one example embodiment, data is only logged if a FLUSH_FSYNC flag is set, which indicates that the dirty data in the buffer pool is to be written to permanent storage for reasons other than it is about to be read by another node.

Once a write transaction has been placed in the recovery log, before a response can be returned to the application to complete the transaction (if needed), the newly added records in the recovery log must be on the NVRAM device.

In one embodiment, once data has been logged, the dirty data in the buffer pool will be written out to permanent storage (from the buffer pool of the file system client 410) by either logwrap or by a write behind thread (based on a timer or some other mechanism).

If the data is not flushed to permanent storage via a writeback thread, then logwrap will write the data to permanent storage prior to removing the records from the recovery log. This is the sub-optimal case, since this may mean that space in the recovery log of the file system client 410 is limited and incoming write threads may need to wait on logwrap for available space. In one embodiment, only the ranges logged are written out to permanent storage, since that is what is required before the log records may be removed from the recovery log of the file system client 410.

In one embodiment, if the optional threshold module 340 (FIG. 3) is implemented, a writeDataLogThreshold configuration parameter is added to the system 400. The writeDataLogThreshold specifies a value of the length of a write transaction byte-range. If the length of the write transaction is at or below this value, then the write transaction is placed in the recovery log. If the length of the write transaction is greater than the writeDataLogThreshold, then the data is not placed in the recovery log and it is written to permanent storage. In one embodiment, optional writeDataLogThreshold may be changed dynamically using the optional threshold module 340 (FIG. 3) while a file system of the system 400 is mounted. In one example, if the value is reduced, then larger write requests simply stop being logged. If the value is increased, then larger write requests will be logged. In another embodiment, the optional writeDataLogThreshold may be set per file system of the system 400. In one embodiment, if it is determined not to place the range in the recovery log, and the byte-range to check overlaps with a byte-range for the file system block that has already been placed in the non-volatile layer, then the system 400 writes all dirty byte-ranges for the file system block to primary storage and places a marker in the non-volatile layer indicating that all previous updates to the file system block are skipped upon recovery that occurs upon node failure.

In one embodiment, to track which ranges have been logged, a new type of dirty bit has been added referred to as "committed." In one example, the committed bits track which ranges are in the recovery log, so that the same range is not logged again and again. In one embodiment, when a logged range, which has not yet experienced logwrap, is re-dirtied, the committed bits for that range are reset so the range will be re-logged.

In one embodiment, the ranges to log are the ones that are dirty, not yet marked committed, and less than the write log size threshold. In one embodiment, the ranges to log are determined by creating a new bit array that is the XOR of committed and dirty bits, and then AND with the dirty bits. In one example, any number of ranges in a single file system block may be logged at one time, as long as each one is less than the write log threshold.

Conventionally, the updates to the dirty and committed bits are synchronized by the fact that the caller has the file system block lock whenever changing them (or the buffer they describe). In one embodiment, with write data logging, additional coordination is required with logwrap to avoid corruption. In one example, while the read and write path use the file system block lock to synchronize with each other, logwrap cannot grab this lock or risk deadlock. In one embodiment, flags are created (used in a similar manner as mutexes) that do not conflict between a read and write path, but will conflict with logwrap.

The portable operating system interface (POSIX) standard does not specify the state of uncommitted changes to a file after a crash. For example, consider a conventional file system with a 4 k block size. Consider an application performing three 256 k writes, A, B, and C, that all overlap to some extent. Each write will dirty 64 pages, and some pages will be dirtied multiple times. The example conventional system makes no guarantees when and in which order these dirty pages are written back to permanent storage. Some of the pages might have been flushed before the write B arrived, some of the pages containing B might have been flushed before write C arrived, and some arbitrary subset of pages containing C might have been flushed before the machine crashed. As result, the file on permanent storage may have some arbitrary combination of pages containing A, B, and C. This is different if the application calls fsync between writing A, B, and C. For example, if fsync after writing B completes successfully, and the machine then crashes while writing C, one would expect that some of the pages to which B was written might contain C instead of B, but none of them should contain A instead of B.

In one example embodiment, consider the code decides to log A and C, but not B. After writing A and an fsync, A will be in the recovery log of file system client 410, but not on permanent storage. In one example, B is written, which "re-dirties" some buffers with data from B, and the subsequent fsync now needs to flush data buffers containing B. If it is decided not to log B and it is placed on permanent storage, it may be worrisome that if a failure occurs right after this second fsync returns, then log recovery will overwrite some of the new B's with old A's, which would be incorrect if B is promised as stable according to POSIX semantics.

To resolve this problem, before the file system replies to the application indicating that B has been successfully placed in permanent storage, in one embodiment, a special record (a "done record") is placed in the recovery log (and placed on NVRAM and possibly replicated) that will prevent log recovery from replaying the log records containing A. So, the file system may choose to either log B or flush the buffer to permanent storage and force (force means to place it on the actual storage device) the done record. That solves a correctness problem for writes that are too large to be logged, because it is always correct to flush without logging, provided the done record is forced. In one embodiment, the case where the new write (B) does not overlap previously logged updates (A), it would be allowed to flush without forcing a done record.

Figure 5:
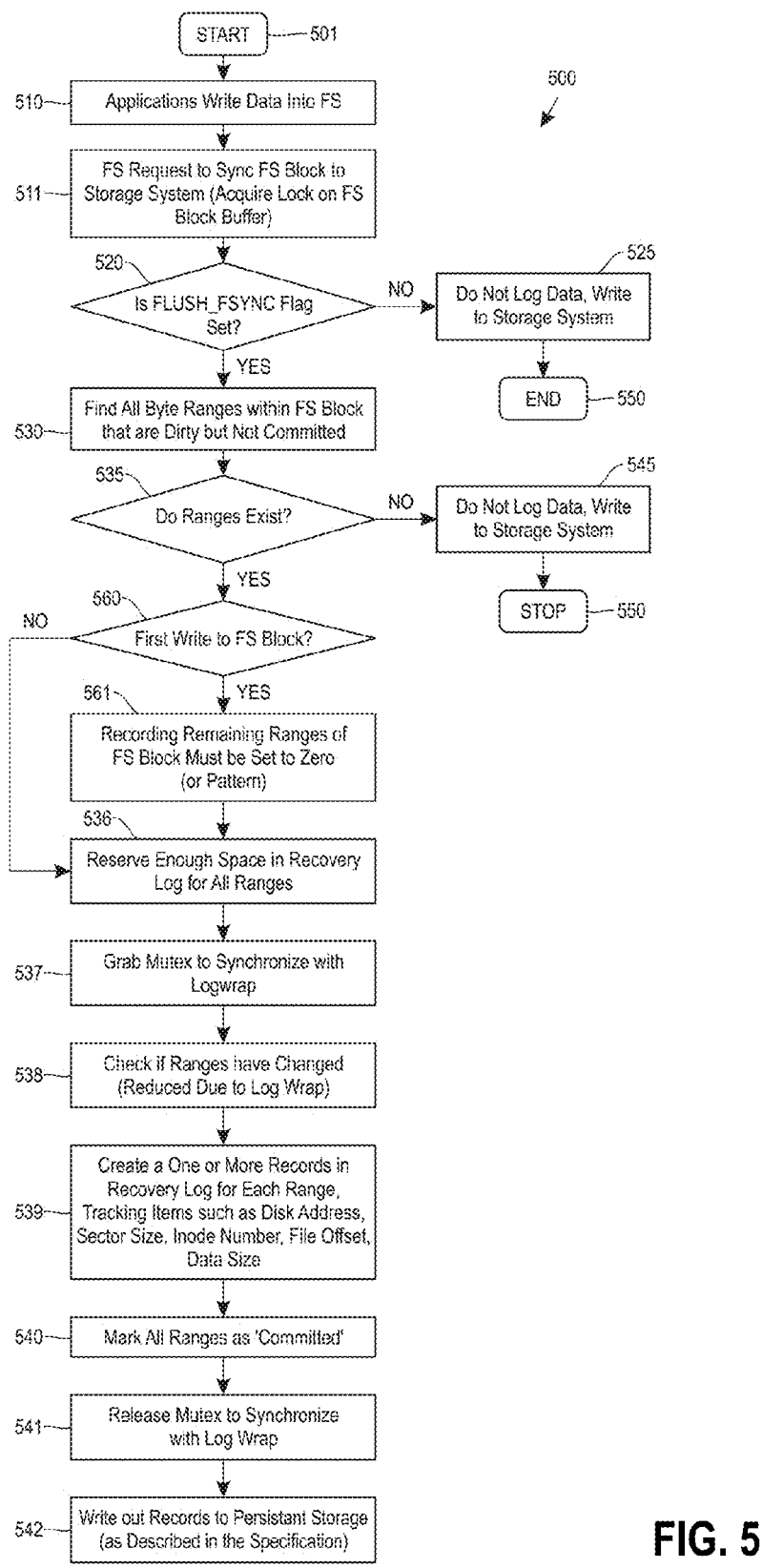
FIG. 5 illustrates an example quick initialization and buffer write data process, in accordance with an embodiment of the invention.

FIG. 5 illustrates an example buffer write data process 500, in accordance with an embodiment of the invention. In one embodiment, the process 500 starts at block 501. In one embodiment, in block 510 executing applications in a system (e.g., system 400, FIG. 4) write data into the file system. In one embodiment, in block 511 the file system requests to Sync a file system (FS) block to the storage system, such as an NSD 425, RAID disk 450, etc. (acquire lock on FS block buffer). In one embodiment, in block 520 it is determined if the FLUSH_FSYNC flag is set. In one embodiment, if the FLUSH_FSYNC flag is set process 500 continues to block 530. If it is determined that the FLUSH_FSYNC flag is not set, process 500 continues to block 525 where it is determined not to log data, and write the data to the storage system. In one embodiment, after block 525, process 500 continues to block 550 and the process 500 ends.

In one embodiment, in block 530 process 500 finds all byte-ranges within a FS block that are dirty but not committed (using bit logic) that satisfy a predefined condition. In one embodiment, process 500 continues to block 535 where it is determined whether uncommitted dirty ranges exist and satisfy the condition. In one embodiment, if it is determined that uncommitted dirty ranges do not exist and do not satisfy the condition, process 500 continues to block 545 where data is not logged and is written to permanent storage. After block 545 (and before block 550), if byte-ranges overlap with a byte-range for the file system block that has already been placed in the non-volatile layer, then the system writes all dirty byte-ranges for the file system block to primary storage and places a marker in the non-volatile layer indicating that all previous updates to the file system block are skipped upon recovery that occurs upon node failure. In one embodiment, process 500 proceeds to block 550 and process 500 ends.

In one embodiment, if it is determined that uncommitted dirty ranges do exist, process 500 continues to block 560. In one embodiment, in block 560, if it is determined that the received write transaction is the first write transaction to the file system block, the process 500 proceeds to invoke the quick initialization process 360 (FIG. 3) and proceeds to block 561. In one embodiment, in block 561 the process 500 provides recording of the remaining ranges of the file system block set to zeroes or a particular bit pattern. In one embodiment, if it is determined that it was not the first write to the file system block or block 561 has been completed, process 500 continues to block 536.

In one embodiment, in block 536 the process 500 reserves enough space in the recovery log for all uncommitted dirty ranges. In one embodiment, in block 537 process 500 acquires a mutex to synchronize with logwrap. In one embodiment, in block 538 process 500 checks if ranges have changed (reduced due to logwrap). In one embodiment, in block 539 one or more records are created in the recovery log for each log range, tracking items such as disk address, sector size, inode number, file offset, and data size.

In one embodiment, in block 540 all dirty ranges are marked as 'committed.' In one embodiment, in block 541 process 500 releases mutex to synchronize with logwrap. In block 542, all log records are written out to persistent storage of the file system. In one embodiment, process 500 then proceeds to block 550 and ends.

In one embodiment, a special System.log pool is created in which to store the file system recovery logs. In one example, inside of this pool, a log may be replicated. To store the log in the NVRAM of each file system client 410 (FIG. 4) node, logical volume is created of each NVRAM and added to this pool. In one example, in this setup one of the copies of the recovery log may not be stored on the local node. In one embodiment, it takes approximately the same amount of time to replicate log records on two remote nodes as one local node and one remote node since input/output (I/O) occurs in parallel.

One or more embodiments provide for: correct synchronization of buffered data additions/deletions with an in-memory copy; correctly synchronize I/O operations from any node in the cluster to logged data to avoid data corruption and adhere to POSIX semantics; proper (POSIX) ordering of metadata and data buffering and recovery; fully parallel buffering replication, flushing, and removal of data; support a replication factor of 1 to N (N being a positive integer); tracking of fine grained data writes and rewrites across user and kernel space (track data ranges that are valid, dirty, and buffered (committed)); support selective write buffering (e.g., size of a write threshold if the optional threshold module 340 (FIG. 3) is implemented); and support for sparse files (avoid the need to zero-out unwritten sections of a block while maintaining an optional threshold).

Figure 6:
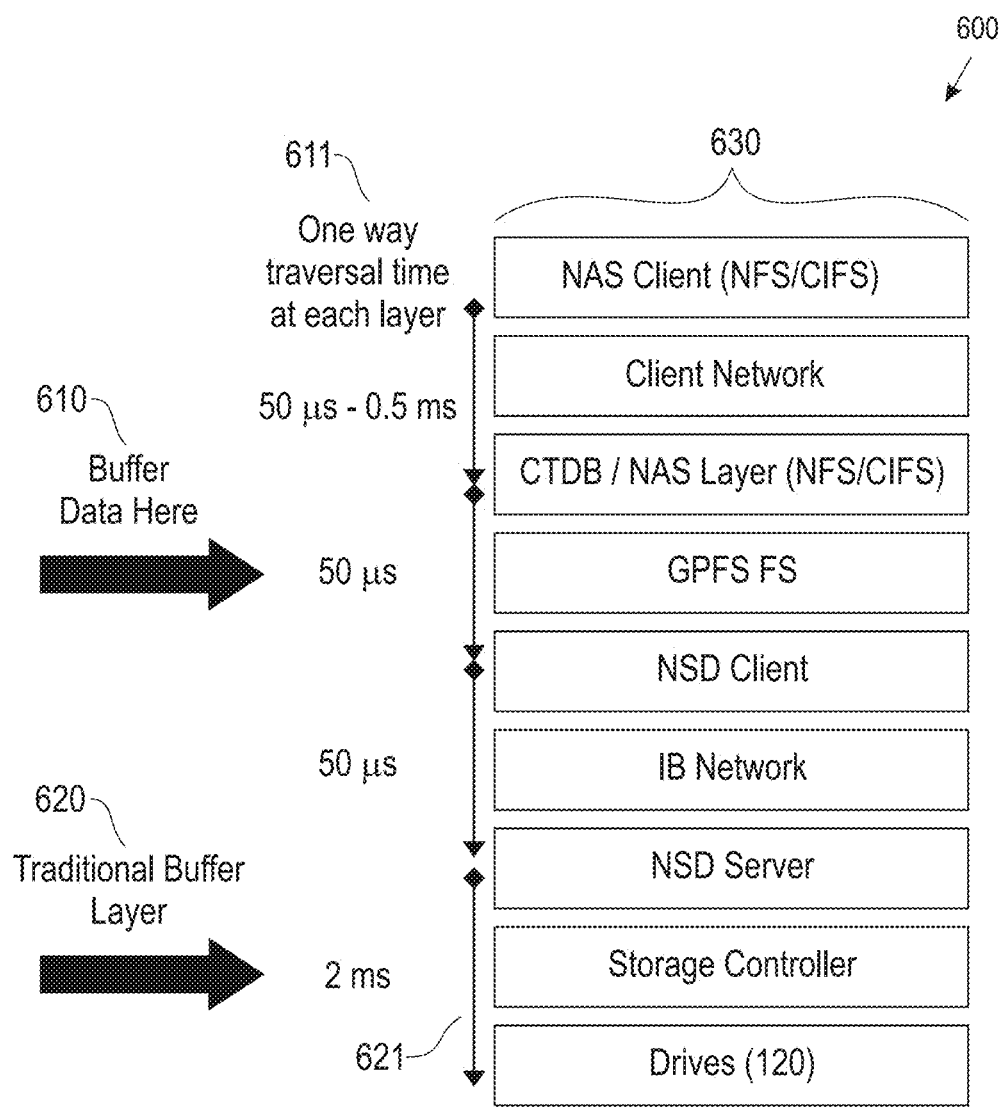
FIG. 6 illustrates an example system layer traversal, in accordance with an embodiment of the invention.

FIG. 6 illustrates an example system layer traversal 600, in accordance with an embodiment of the invention. In one example, the system layer traversal includes multiple layers 630 where data traverses one way with the approximate one-way traversal times 611 at each layer. In the example, the total round trip time is about 5 ms for 4 KB of data. In one example, the conventional/traditional FS system stores data at the traditional buffer layer 620 into the FS log. In one embodiment, the data is stored at reference 610 using the FS recovery log in a FS 410 (FIG. 4) using a process, such as process 500, FIG. 5 or process 700, FIG. 7). As shown, the traditional layer 620 stores data at the storage controller layer 621 at about 2 ms, whereas one embodiment stores data at the file system buffer layer at about 50 μs.

Figure 7:
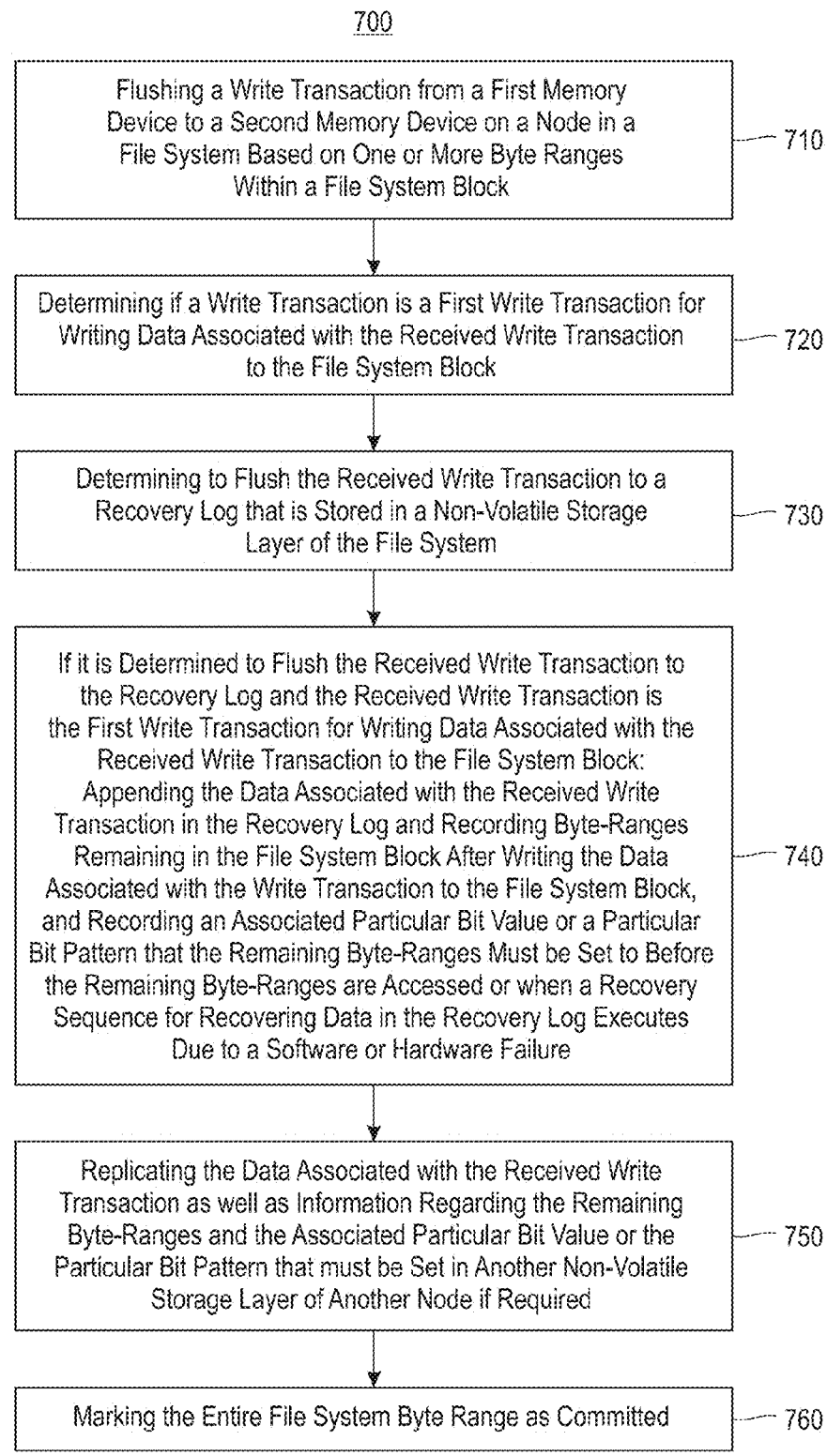
FIG. 7 is a block diagram showing a process for quick initialization using buffering and replicating particular regions for a distributed storage system, in accordance with an embodiment of the invention.

FIG. 7 is a block diagram showing a process 700 for quick initialization using buffering and replicating particular regions (e.g., zeroes or a particular bit value or pattern) in a distributed file system, in accordance with an embodiment of the invention. In one embodiment, in block 710, a received write transaction is flushed from a first memory device (e.g., an NVRAM, recovery log of a file system client 410, FIG. 4) to a second memory device (e.g., NSD 425, RAID disk 450, primary storage device, etc.) on a node in a file system (e.g., system 400) based on one or more byte-ranges within a file system block. In one embodiment, in block 720 it is determined if the received write transaction is a first write transaction for writing data associated with the received write transaction to the file system block. In one embodiment, in block 730 it is determined to flush the received write transaction to a recovery log that is stored in a non-volatile storage layer of the file system. In one embodiment, in block 740 if it is determined to flush the received write transaction to the recovery log and the received write transaction is the first write transaction for writing the data associated with the received write transaction to the file system block: then the method includes appending the data associated with the received write transaction in the recovery log and recording byte-ranges remaining in the file system block after writing the data associated with the write transaction to the file system block, and recording an associated particular bit value or a particular bit pattern that the remaining byte-ranges must be set to before the remaining byte-ranges are accessed or when a recovery sequence for recovering data in the recovery log executes due to a software or hardware failure. In one embodiment, in block 750 the process replicates the data associated with the write transaction as well as information regarding the remaining byte-ranges and the associated particular bit value or the particular bit pattern that must be set in another non-volatile storage layer of another node if required. In one embodiment, in block 760, the entire file system block byte-range as committed.

In one embodiment, process 700 may further determine to flush the received write transaction based on whether an application has requested the flush, a timer has expired, avoidance of data corruption or loss is required, or the data associated with the write transaction must be on the secondary memory device to maintain POSIX semantics. In one embodiment, process 700 may include determining if a byte-range is to be placed in the recovery log based on whether the byte-range is not already marked as committed and a particular policy is met, for example, to see if they are less than the threshold size (e.g., the threshold may be dynamically set based on system/operator constraints, the threshold may be a predetermined size, etc.), dependent on available resources (e.g., recovery log memory available), etc.

In one embodiment, in process 700 the first memory device comprises a volatile memory device, and the second memory device comprises a primary storage device on the node of the file system. In one embodiment, process 700 may further include that upon node or file system failure, quiescing file system and flushing data requests from the non-volatile storage layer into the primary storage device and writing the associated particular bit value or the particular bit pattern to fill in the byte-ranges of the file system block on the primary storage device as recorded in the non-volatile storage layer, and then unquiescing the file system to ensure proper POSIX semantics.

In one embodiment, process 700 may further include upon loss of access to a copy of data and recorded byte-ranges and the associated particular bit value or the particular bit pattern in the non-volatile storage layer that is on a different node than the node that is placing requests in the recovery log, re-replicating data to ensure correct number of copies.

In one embodiment, process 700 may further include integrating a file system recovery log layer in the file system, wherein the file system includes a distributed non-volatile storage layer that buffers (stores) data committed to a stable storage on cluster nodes of the file system. In one embodiment, process 700 may further include flushing dirty and committed data to the primary storage device one of periodically or in response to a file system request, and marking the dirty data as no longer dirty. In one embodiment, in response to memory or space pressure, or a timer expiring, process 700 may traverse the recovery log and mark logged byte-ranges and byte-ranges with the associated particular bit value or the particular bit pattern as no longer committed based on: determining if logged byte-ranges are still dirty; if the logged byte-ranges are still dirty, flushing data and writing the associated particular bit value or the particular bit pattern to fill in the byte-ranges of the file system block on the primary storage device as recorded in the distributed non-volatile storage layer to the primary storage device; and marking the logged byte-ranges as no longer dirty. In one embodiment, process 700 may include removing byte-range records, bit value and bit pattern records from the recovery log.

In one embodiment, process 700 may include in response to a read transaction for dirty data located on a file system node other than a node on which the dirty data is present, coordinating flushing the dirty data to a primary storage device on the node with the dirty data prior to satisfying the read transaction.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   Flushing a received write transaction from a first memory device to a second memory device on a node in a file system based on byte-range within a file system block;
   Determining if the received write transaction is a first write transaction for writing data associated with the received write transaction to the file system block;
   Integrating a file system recovery log layer in the file system, wherein the file system buffers data in a cyclical manner, transforming all incoming random requests into a series of synchronous sequential updates;
   Determining to flush the received write transaction to a recovery log that is stored in a non-volatile storage layer of the file system;
   If it is determined to flush the received write transaction to the recovery log and the received write transaction is the first write transaction for writing the data associated with the received write transaction to the file system block:
      Appending the data associated with the received write transaction in the recovery log and recording byte-ranges remaining in the file system block after writing the data associated with the write transaction to the files system block, and recording associated particular bit information that the remaining byte-ranges must be set to when a recovery sequence for recovering data in the recovery log executes due to a system failure;
      Replicating the data associated with the received write transaction as well as information regarding the remaining byte-ranges and the associated particular bit information that must be set in another non-volatile storage layer of another node if required; and
      Marking the entire file system block byte-range as committed.

2. The method of claim 1, wherein determining to flush the received write transaction is based on at least one of: an application has requested the flush, a time has expired, to avoidance of data corruption or loss is required, and the data associated with the write transaction must be on the secondary memory device to maintain portable operating system interface (POSIX) semantics.

3. The method of claim 1, further comprising:
   Determining if a byte-range is to be placed in a recovery log based on whether the byte-range is not already marked as committed and a particular policy is met; and
   Recording the associated particular bit value or a particular bit pattern that the remaining byte-ranges must be set to before the remaining byte-ranges are accessed;
      Wherein the associated particular bit information comprises one of: a bit value and a bit pattern.

4. The method of claim 1, further comprising if the application updates a byte-range of a file system block in which at least a portion is marked as committed, clearing one or more committed markings on the byte-range of a new write transaction and marking the byte-range as dirty.

5. The method of claim 3, wherein the first memory device comprises a volatile memory device (RAM), and the second memory devices comprises a primary storage device on the node of the file system.

6. The method of claim 5, further comprising:

Upon node or file system failure, flushing data requests from the non-volatile storage layer into the primary storage device and writing the associated particular bit value or the particular bit pattern to fill the byte-ranges of the file system block on the primary storage device as recorded in the non-volatile storage layer, and then unquiescing the file system.

7. The method of claim 5, further comprising:

Upon loss of access to a copy of data and recorded byte-ranges and the associated particular bit value or the particular bit pattern in the non-volatile storage layer that is on a different node than the node that is placing requests in the recovery log, re-replicating data to ensure correct number of copies.

8. The method of claim 5, further comprising:

Buffering, by a distributed non-volatile storage layer, data committed to a stable storage on cluster nodes in the file system;

Flushing dirty and committed data to the primary storage device one of periodically or in response to a file system request, and marking the data no longer dirty; and In response to memory or space pressure, or a timer expiring, traversing the recovery log and marking logged byte ranges and byte-ranges with an associated particular bit value or particular bit pattern as no longer committed based on:

Determining if logged byte-ranges are still dirty;

If the logged byte-ranges are still dirty, flushing data and writing the associated particular bit value or the particular bit pattern to fill in the byte-ranges of the file system block on the primary storage device as recorded in the distributed non-volatile storage layer to the primary storage device; and Marking the logged byte-ranges as no longer dirty; and Removing byte-range records and bit value or bit pattern records from the recovery log.

9. The method of claim 8, further comprising:

In response to a read transaction for dirty data located on a file system node other than a node on which the dirty data is present, coordinating flushing the dirty data to a primary storage device on the node with the dirty data prior to satisfying the read transaction.

10. A computer program product for quick initialization using storage and replication, the computer program product comprising a computer readable storage medium having program code embodied therewith, the program code executable by a processor to:

Flush a received write transaction from a first memory device to a second memory device on a node in a file system based on byte-range within a file system block;

Determine if the received write transaction is a first write transaction for writing data associated with the received write transaction to the file system block;

Integrate a file system recovery log layer in the file system, wherein the file system buffers data in a cyclical manner, transforming all incoming random requests into a series of synchronous sequential updates;

Determine to flush the received write transaction to a recovery log that is stored in a non-volatile storage layer of the file system;

If it is determined to flush the received write transaction to the recovery log and the received write transaction is the first write transaction for writing the data associated with the received write transaction to the file system block:

Append the data associated with the received write transaction in the recovery log and recording byte-ranges remaining in the file system block after writing the data associated with the write transaction to the files system block, and recording associated particular bit information that the remaining byte-ranges must be set to when a recovery sequence for recovering data in the recovery log executes due to a system failure;

Replicate the data associated with the received write transaction as well as information regarding the remaining byte-ranges and the associated particular bit information that must be set in another non-volatile storage layer of another node if required; and Mark the entire file system block byte-range as committed.

11. The computer program product of claim 10, wherein determining to flush the received write transaction is based on whether an application has requested the flush, a time has expired, to avoidance of data corruption or loss is required, or the data associated with the write transaction must be on the secondary memory device to maintain portable operating system interface (POSIX) semantics.

12. The computer program product of claim 10, further comprising:

Determine if a byte-range is to be placed in a recovery log based on whether the byte-range is not already marked as committed and a particular policy is met; and Record the associated particular bit value or a particular bit pattern that the remaining byte-ranges must be set to before the remaining byte-ranges are accessed;

Wherein the associated particular bit information comprises one of: a bit value and a bit pattern.

13. The computer program product of claim 10, further comprising the application updates a byte-range of a file system block in which at least a portion is marked as committed, clearing one or more committed markings on the byte-range of a new write transaction and marking the byte-range as dirty, and the first memory device comprises a volatile memory device, and the second memory device comprises a primary storage device on the node of the file system.

14. The computer program product of claim 12, further comprising:

Upon node or file system failure, quiesce file system and flushing data requests from the non-volatile storage layer into the primary storage device and writing the associated particular bit value or the particular bit pattern to fill the byte-ranges of the file system block on the primary storage device as recorded in the non-volatile storage layer, and then unquiesce the file system.

15. The computer program product of claim 14, further comprising:

Upon loss of access to a copy of data associated with the write transaction and the recorded byte-ranges remaining in the file system block and the associated particular bit value or the particular bit pattern in the non-volatile storage layer that is on a different node than the node that is placing requests in the recovery log, re-replicate the data associated with the write transaction to ensure correct number of copies;

Buffering, by a distributed non-volatile storage layer of the file system, data committed to a stable storage on cluster nodes of the file system;

Flushing dirty and committed data to the primary storage device one of periodically or in response to a file system request, and marking the dirty data no longer dirty; and In response to memory or space pressure, or a timer expiring, traversing the recovery log and marking logged byte-ranges and byte-ranges with the associated particular bit value or the particular bit pattern as no longer committed based on:

Determining if logged byte-ranges are still dirty;

If the logged byte-ranges are still dirty, flushing the dirty data and writing the associated particular bit value or the particular bit pattern to fill in the byte ranges of the file system block on the primary storage device as recorded in the distributed non-volatile storage layer to the primary storage device; and Marking the logged byte-ranges as no longer dirty; and Removing byte-range records and bit value or bit pattern records from the recovery log.

16. The computer program product of claim 15, further comprising:

In response to a read transaction for dirty data located on a file system node other than a node on which the dirty data is present, coordinate flushing the dirty data to a primary storage device on the node with the dirty data prior to satisfying the read transaction.

17. A system comprising:

A file system including a primary storage device; and

A client note device coupled with a recovery log and a first memory device, the client node including process that:

Flushes a received write transaction from a first memory device to the primary memory device on a node in a file system based on at least one byte-range for a file system block;

Determines if the received write transaction is a first write transaction for writing data associated with the received write transaction to the file system block;

Integrates a file system recovery log layer in the file system, buffers data in a cyclical manner, transforms all incoming random requests into a series of synchronous sequential updates;

Determines to flush the received write transaction to a recovery log that is stored in a non-volatile storage layer of the file system; and If it is determined to flush the received write transaction to the recovery log:

Appends the data associated with the received write transaction in the recovery log and records byte-ranges remaining in the file system block after writing the data associated with the write transaction to the files system block, and records associated particular bit information that the remaining byte-ranges must be set to when a recovery sequence for recovering data in the recovery log executes due to a system failure;

Replicates the data associated with the received write transaction as well as information regarding the remaining byte-ranges and the associated particular bit information that must be set in another non-volatile storage layer of another node if required; and Markis the entire file system block byte-range as committed.

18. The system of claim 17, further comprising if the process updates a byte-range of a file system block in which at least a portion is marked as committed, the process clears one or more committed markings on the byte-range of a new write transaction and marks the byte-range as dirty, wherein the system further comprising:

Upon node or file system failure, the process quiesces file system and flushing data requests from the non-volatile storage layer into the primary storage device and writing the associated particular bit information to fill in the byte-ranges of the file system block on the primary storage device as recorded in the non-volatile storage layer, and then unquiesces the file system, wherein the associated particular bit information comprises one of: a bit value and a bit pattern; and The process records the associated particular bit value or a particular bit pattern that the remaining byte-ranges must be set to before the remaining byte-ranges are accessed.

19. The system of claim 18, further comprising:

Upon loss of access to a copy of data and recorded byte-ranges and the associated particular bit value or the particular bit pattern in the non-volatile storage layer that is on a different node than the node that is placing requests in the recovery log, the process re-replicates data to ensure correct number of copies.

20. The system of claim 18, further comprising:

Buffers, by a distributed non-volatile storage layer in the file system, data committed to a stable storage on cluster nodes in the file system;

Flushes dirty and committed data to the primary storage device one of periodically or in response to a file system request, and marking the data no longer dirty; and In response to memory or space pressure, or a timer expiring, traverses the recovery log and marking logged byte ranges and byte-ranges with an associated particular bit value or particular bit pattern as no longer committed based on the process:

Determining if logged byte-ranges are still dirty;

If the logged byte-ranges are still dirty, flushing data and writing the associated particular bit value or the particular bit pattern to fill in the byte-ranges of the file system block on the primary storage device as recorded in the distributed non-volatile storage layer to the primary storage device; and Marking the logged byte-ranges as no longer dirty; and Removing byte-range records and bit value or bit pattern records from the recovery log.

* * * * *